Patented Jan. 12, 1954

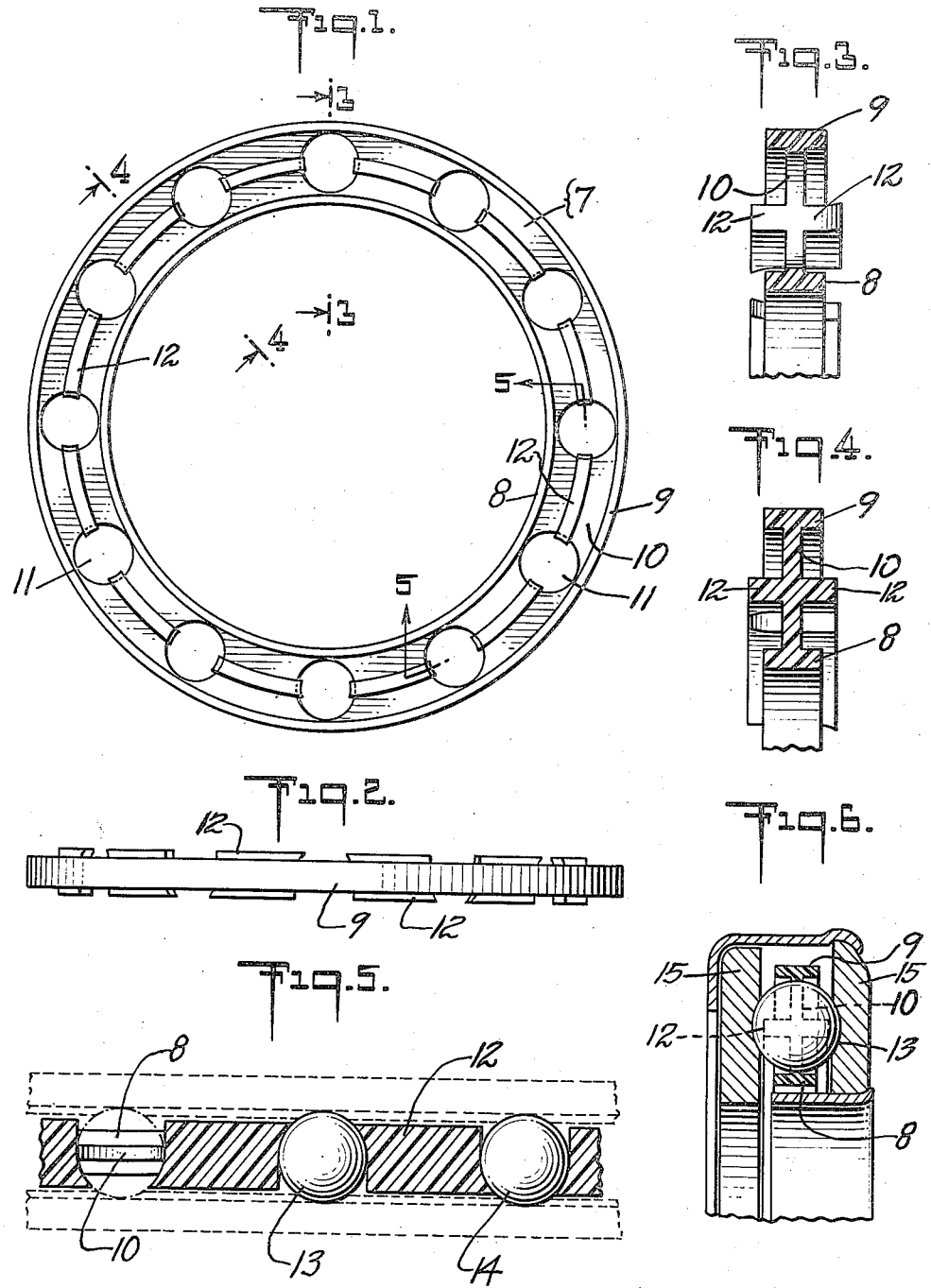

2,665,958

UNITED STATES PATENT OFFICE 2,665,958

BALL RETAINER RING FOR BALL BEARINGS

John Waldherr, Jr., Fairfield, Ill., assignor to Chefford Master Manufacturing Co. Inc., a corporation of Illinois Application January 29, 1952, Serial No. 268,877

4 Claims. (Cl. 308—201)

This invention relates to a ball retainer ring for ball bearings. The ring is useful both for ball bearings such as are used between a wheel and its shaft or for thrust ball bearings which are used as the clutch release bearing of an automobile. The retainer ring illustrated herein is shown embodied in a thrust ball bearing, but as will be readily understood by those skilled in the art, it will also serve in the other type of ball bearing noted above. Patent No. 2,235,431 to M. Katcher shows the set up of a clutch release bearing.

It is an object of this invention to use a retainer ring of substantially frictionless non-metallic material which is strong, light, and of such a character that particles abraded from it will not form with the lubricant a lapping or grinding compound which will deteriorate the bearing. Plastic material, such as nylon, is the preferred material for this purpose. Melamine plastic also might be used.

Another object of the invention is the form of the retainer ring, which is such that it is centralized between the race rings by the balls. Some of the balls fit into the retainer from one side and the rest of the balls from the other side.

Other objects and advantages will become apparent upon further study of the description and drawing, in which:

Fig. 1 is an elevation of the retainer ring.

Fig. 2 is an edge view of the retainer ring.

Fig. 3 is a section taken along the line 3—3 of Fig. 1.

Fig. 4 is a section taken along the line 4—4 of Fig. 1.

Fig. 5 is a partial circumferential section taken along the line 5—5 of Fig. 1, showing balls in two of the openings with opposing race rings of a bearing shown dotted, and Fig. 6 is a partial section of the retainer ring shown mounted with a ball in a portion of a ball thrust bearing.

The ball retainer ring, denoted in its entirety by the numeral 7, is provided with an inner circumferential flange 8 and an outer circumferential flange 9. Extending between these flanges is a web 10 having ball openings 11 therein. Located centrally between flanges 8 and 9 and concentric therewith is a plurality of extensions 12, which in reality constitute an axially extending rib interrupted by holes 11. Extensions 12 extend between ball openings 11. The opposing edges of consecutive extensions 12 are concaved, as seen in Fig. 5, for the insertion of a ball 13 between them, the concavity being spherical for a part of the depth of the extensions for a snug fit with a portion of the periphery of the ball. The concavity between the opposing edges of alternate pairs of extensions faces in opposite directions, as seen in Fig. 5, where ball 13 is set in from one side while ball 14 is set in from the opposite side. This opposition is what maintains retainer ring 7 substantially centralized between race rings 15. It is not essential, although preferable, that the concavity of the gap between the ribs alternate between consecutive pairs of ribs. The concavity of a few consecutive gaps may face one way followed by the concavity of a few other consecutive gaps facing the other way, so long as there is a substantial even balance to keep the retainer ring 7 substantially centralized between race rings 15. The opposing edges of extensions 12 have a spherical contour which is contiguous with the edge of the web at a hole. The edge of the web at the hole is likewise of spherical contour. The radius of curvature of the edges of the extensions 12 or rib at a hole 11 and of the edge of the hole itself is substantially equal to that of the ball 13 to be set in it.

I claim:

1. For use in a ball bearing having race rings and balls between said rings, a non-metallic ball retainer ring for holding the balls in spaced relation having an inner and an outer flange and a web extending between the flanges substantially at the mid-depth of the flanges, said web being provided with a plurality of circumferentially spaced holes, the edge of the web at a hole being adapted to embrace a ball when set therein, and a plurality of pairs of axial extensions on the web, one of the extensions of each pair being on an opposite side of the hole circumferentially of the retainer ring from the other extension of the pair and on the same axial side of the web, each pair of extensions overlapping a hole to prevent a ball from passing completely through the retainer ring, some pairs of extensions being on one side of the web and others on the other side of the web.

2. For use in a ball bearing having race rings and balls between said rings, a ball retainer ring for holding the balls in spaced relation having an inner and an outer flange, said flanges being concentric, a web extending between the flanges substantially at the mid-depth of the flanges, said web being provided with a plurality of circumferentially spaced holes for receiving the balls, and a central rib concentric with the flanges extending on both sides of the web, said rib being interrupted at the holes, oppositely disposed portions of the rib in pairs extending over the holes, some of said pairs extending over the holes on one side of the web and other pairs extending over the holes on the other side of the web, the edges of the pairs at the holes being formed to retain the balls substantially centrally of the web against axial motion therethrough from opposite sides of the web.

3. For use in a ball bearing having race rings and balls between said rings, a synthetic plastic ball retainer ring for holding the balls in spaced relation, said ball retainer ring having a web provided with a plurality of circumferentially spaced holes for receiving the balls, and a central rib extending circumferentially of the web and extending axially on both sides of the web, said rib being interrupted at the holes, oppositely disposed portions of the rib in pairs extending over the holes, some of said pairs extending over the holes on one side of the web and other pairs extending over the holes on the other side of the web, to retain the balls against axial motion through the web from opposite sides thereof, the edges of a pair where they extend over a hole being contiguous with the edge of the web at the hole, said edges of the pair and the web at a hole being of spherical contour with a radius of curvature substantially equal to that of a ball, the distance across the holes at substantially the center of the web being substantially equal to the diameter of a ball.

4. For use in a ball bearing having race rings and balls between said rings, a ball retainer ring for holding the balls in spaced relation having an inner and an outer flange, a web extending between the flanges at an intermediate place in the depth of the flanges, said web being provided with a plurality of circumferentially spaced holes for receiving the balls, and a rib on the web intermediate of the flanges and extending on both sides of the web, said rib being interrupted at the holes, oppositely disposed portions of the rib in pairs extending over the holes, some of said pairs extending over the holes on one side of the web and other pairs extending over the holes on the other side of the web, the edges of the pairs at the holes being formed to retain the balls in the web against axial motion therethrough from opposite sides of the web.

JOHN WALDHERR, Jr.

References Cited in the file of this patent

UNITED STATES PATENTS

| Number | Name | Date |
|---|---|---|
| 2,246,086 | Austin | June 17, 1941 |

FOREIGN PATENTS

| Number | Country | Date |
|---|---|---|
| 284,620 | Great Britain | July 12, 1928 |
| 340,433 | France | July 6, 1904 |
| 993,520 | France | July 25, 1951 |